United States Patent
Ouimette et al.

(10) Patent No.: US 9,942,392 B1
(45) Date of Patent: *Apr. 10, 2018

(54) USING A SPEECH ANALYTICS SYSTEM TO CONTROL RECORDING CONTACT CENTER CALLS IN VARIOUS CONTEXTS

(71) Applicant: Noble Systems Corporation, Atlanta, GA (US)

(72) Inventors: Jason P. Ouimette, Berkeley Lake, GA (US); Karl H. Koster, Sandy Springs, GA (US)

(73) Assignee: Noble Systems Corporation, Atlanta, GA (US)

(*) Notice: Subject to any disclaimer, the term of this patent is extended or adjusted under 35 U.S.C. 154(b) by 10 days.

This patent is subject to a terminal disclaimer.

(21) Appl. No.: 14/833,236

(22) Filed: Aug. 24, 2015

Related U.S. Application Data (63) Continuation of application No. 14/088,763, filed on Nov. 25, 2013, now Pat. No. 9,154,623.

(51) Int. Cl.
    *H04M 1/64* (2006.01)
    *H04M 3/42* (2006.01)
    *H04M 3/51* (2006.01)
    *H04M 11/00* (2006.01)

(52) U.S. Cl.
    CPC ... *H04M 3/42221* (2013.01); *H04M 3/42348* (2013.01); *H04M 3/5175* (2013.01); *H04M 3/5183* (2013.01)

(58) Field of Classification Search
    CPC ............ H04M 1/656; H04M 1/72572; H04M 2242/14; H04M 3/2281; H04M 3/42221
    USPC ..... 379/68–85, 88.01–88.19, 265.04–266.09
    See application file for complete search history.

(56) References Cited

U.S. PATENT DOCUMENTS

| | | | |
|---|---|---|---|
| 5,267,305 | A | 11/1993 | Prohs et al. |
| 5,270,920 | A | 12/1993 | Pearse et al. |
| 6,157,808 | A | 12/2000 | Hollingsworth et al. |
| 6,356,634 | B1 | 3/2002 | Noble, Jr. |
| 6,721,416 | B1 | 4/2004 | Farrell |
| 6,862,343 | B1 | 3/2005 | Vacek et al. |
| 6,988,205 | B2 | 1/2006 | Walker et al. |
| 7,133,828 | B2 | 11/2006 | Scarano et al. |
| 7,227,930 | B1 | 6/2007 | Othmer et al. |
| 7,313,512 | B1 | 12/2007 | Traut et al. |

(Continued)

OTHER PUBLICATIONS

U.S. Appl. No. 61/7753,641, filed Dec. 31, 1899, Watson et al.

(Continued)

*Primary Examiner* — Solomon Bezuayehu (57) ABSTRACT

An architecture and process flow for a system that processes event notifications from a speech analytics system for the purpose of controlling the recording of calls in a contact center for various contexts. Based on the regulatory context of the call, call recording may require requesting and receiving consent from the remote party to record the call. A speech analytics system operating in conjunction with an event handler module and a call recording application specific module can facilitate automatically recording the call and minimize agent intervention. The application specific module may provide icons and text on the agent's display to remind or inform the agent of the context and various conditions. The application specific module may also control various recording equipment.

13 Claims, 4 Drawing Sheets

(56) References Cited

U.S. PATENT DOCUMENTS

| | | | |
|---|---|---|---|
| 7,542,902 B2 | 6/2009 | Scahill et al. |
| 7,548,539 B2 | 6/2009 | Kouretas et al. |
| 7,574,000 B2 | 8/2009 | Blair |
| 7,672,845 B2 | 3/2010 | Beranek et al. |
| 7,752,043 B2 | 7/2010 | Watson |
| 7,930,179 B1 | 4/2011 | Gorin et al. |
| 7,974,411 B2 | 7/2011 | Krishnapuram et al. |
| 8,027,458 B1 | 9/2011 | Pollock |
| 8,077,832 B2 | 12/2011 | Othmer et al. |
| 8,078,470 B2 | 12/2011 | Levanon |
| 8,094,790 B2 | 1/2012 | Conway et al. |
| 8,094,803 B2 | 1/2012 | Danson et al. |
| 8,130,937 B1 | 3/2012 | Thenthiruperai et al. |
| 8,136,026 B2 | 3/2012 | Commarford et al. |
| 8,155,297 B1 | 4/2012 | Dhir et al. |
| 8,175,007 B2 | 5/2012 | Jain et al. |
| 8,180,643 B1 | 5/2012 | Pettay et al. |
| 8,204,180 B1 | 6/2012 | Narayanan et al. |
| 8,209,182 B2 | 6/2012 | Narayanan |
| 8,219,401 B1 | 7/2012 | Pettay et al. |
| 8,249,875 B2 | 8/2012 | Levanon et al. |
| 8,275,115 B1 | 9/2012 | Everingham et al. |
| 8,315,374 B2 | 11/2012 | Perlmutter |
| 8,396,205 B1 | 3/2013 | Lowry et al. |
| 8,396,732 B1 | 3/2013 | Nies et al. |
| 8,401,155 B1 | 3/2013 | Barnes et al. |
| 8,422,641 B2 | 4/2013 | Martin, II |
| 8,463,606 B2 | 6/2013 | Scott et al. |
| 8,477,915 B1 | 7/2013 | Vasquez et al. |
| 8,494,966 B2 | 7/2013 | Xu et al. |
| 8,504,371 B1 | 8/2013 | Vacek et al. |
| 8,531,501 B2 | 9/2013 | Portman et al. |
| 8,649,499 B1 | 2/2014 | Koster et al. |
| 8,761,376 B2 | 6/2014 | Pande et al. |
| 8,767,948 B1 | 7/2014 | Riahi et al. |
| 8,781,092 B2 | 7/2014 | Noble, Jr. |
| 8,831,204 B1 | 9/2014 | Pycko et al. |
| 8,873,720 B1* | 10/2014 | Ouimette | H04M 3/42221 |
| | | | 379/266.1 |
| 8,949,128 B2 | 2/2015 | Meyer et al. |
| 9,014,364 B1 | 4/2015 | Koster et al. |
| 9,191,508 B1 | 11/2015 | Mekonnen et al. |
| 9,225,833 B1 | 12/2015 | Koster et al. |
| 9,299,343 B1 | 3/2016 | Koster et al. |
| 9,307,084 B1 | 4/2016 | Pycko et al. |
| 9,350,866 B1 | 5/2016 | Mekonnen et al. |
| 9,407,758 B1 | 8/2016 | Pycko et al. |
| 9,438,730 B1 | 9/2016 | Lillard et al. |
| 9,456,083 B1 | 9/2016 | Ouimette |
| 9,473,634 B1 | 10/2016 | Ouimette et al. |
| 2003/0002651 A1 | 1/2003 | Shires |
| 2003/0154120 A1 | 8/2003 | Freishtat et al. |
| 2004/0008828 A1 | 1/2004 | Coles et al. |
| 2004/0249650 A1 | 12/2004 | Freedman et al. |
| 2005/0147228 A1 | 7/2005 | Perrella et al. |
| 2005/0216269 A1 | 9/2005 | Scahill et al. |
| 2005/0226395 A1* | 10/2005 | Benco | H04M 3/42221 |
| | | | 379/85 |
| 2005/0238161 A1 | 10/2005 | Yacoub et al. |
| 2005/0283475 A1 | 12/2005 | Beranek et al. |
| 2005/0286705 A1 | 12/2005 | Contolini et al. |
| 2005/0286706 A1 | 12/2005 | Fuller |
| 2006/0050658 A1 | 3/2006 | Shaffer et al. |
| 2006/0111953 A1 | 5/2006 | Setya |
| 2006/0182260 A1 | 8/2006 | McGraw et al. |
| 2006/0233346 A1 | 10/2006 | McIlwaine et al. |
| 2006/0256954 A1 | 11/2006 | Patel et al. |
| 2006/0259473 A1 | 11/2006 | Li et al. |
| 2006/0262919 A1 | 11/2006 | Danson et al. |
| 2006/0265090 A1 | 11/2006 | Conway et al. |
| 2007/0011337 A1 | 1/2007 | Brown et al. |
| 2007/0088563 A1 | 4/2007 | Nardolli, Jr. et al. |
| 2007/0111180 A1 | 5/2007 | Sperle et al. |
| 2007/0160054 A1 | 7/2007 | Shaffer et al. |
| 2007/0198330 A1 | 8/2007 | Korenblit et al. |
| 2007/0211876 A1* | 9/2007 | Othmer | H04M 1/656 |
| | | | 379/201.01 |
| 2007/0280211 A1 | 12/2007 | Malueg et al. |
| 2007/0280460 A1 | 12/2007 | Harris et al. |
| 2008/0002823 A1 | 1/2008 | Fama et al. |
| 2008/0027785 A1 | 1/2008 | Mechaley et al. |
| 2008/0037719 A1 | 2/2008 | Doren |
| 2008/0082330 A1 | 4/2008 | Blair |
| 2008/0240376 A1 | 10/2008 | Conway et al. |
| 2008/0270123 A1 | 10/2008 | Levanon et al. |
| 2009/0157449 A1 | 6/2009 | Itani et al. |
| 2009/0295536 A1 | 12/2009 | Doren |
| 2010/0036670 A1 | 2/2010 | Hill et al. |
| 2010/0082342 A1 | 4/2010 | Erhart et al. |
| 2010/0104086 A1 | 4/2010 | Park |
| 2010/0138411 A1 | 6/2010 | Judy et al. |
| 2010/0158237 A1 | 6/2010 | McCormack et al. |
| 2010/0161990 A1 | 6/2010 | Statham et al. |
| 2011/0010173 A1 | 1/2011 | Scott et al. |
| 2011/0026688 A1 | 2/2011 | Simpson |
| 2011/0033036 A1 | 2/2011 | Edwards et al. |
| 2011/0125499 A1 | 5/2011 | Griggs et al. |
| 2011/0145093 A1 | 6/2011 | Paradise et al. |
| 2011/0202344 A1 | 8/2011 | Meyer et al. |
| 2011/0218798 A1 | 9/2011 | Gavalda |
| 2011/0228919 A1 | 9/2011 | Tew et al. |
| 2011/0287748 A1 | 11/2011 | Angel et al. |
| 2011/0307258 A1 | 12/2011 | Liberman et al. |
| 2011/0317828 A1 | 12/2011 | Garfield |
| 2012/0027189 A1 | 2/2012 | Shaffer et al. |
| 2012/0045043 A1 | 2/2012 | Timpson |
| 2012/0140911 A1 | 6/2012 | Johansen et al. |
| 2012/0263285 A1 | 10/2012 | Rajakumar et al. |
| 2013/0003943 A1 | 1/2013 | Munns et al. |
| 2013/0129069 A1 | 5/2013 | Peterson |
| 2013/0246053 A1 | 9/2013 | Scott et al. |
| 2013/0266127 A1 | 10/2013 | Schachter et al. |
| 2014/0100848 A1 | 4/2014 | Shaffer et al. |
| 2014/0140496 A1 | 5/2014 | Ripa et al. |
| 2014/0140497 A1 | 5/2014 | Ripa et al. |
| 2014/0163960 A1 | 6/2014 | Dimitriadis et al. |
| 2014/0241519 A1 | 8/2014 | Watson et al. |
| 2014/0257820 A1 | 9/2014 | Laperdon et al. |
| 2014/0379525 A1 | 12/2014 | Timem et al. |
| 2015/0106091 A1 | 4/2015 | Netjen et al. |
| 2015/0281445 A1 | 10/2015 | Kumar et al. |
| 2015/0281446 A1 | 10/2015 | Milstein et al. |

OTHER PUBLICATIONS

Notice of Allowance Received for U.S. Appl. No. 14/230,328 dated Feb. 6, 2015.

Office Action Received for U.S. Appl. No. 14/661,676 dated Sep. 21, 2015.

Notice of Allowance Received for U.S. Appl. No. 14/661,676 dated Nov. 20, 2015.

Office Action Received for U.S. Appl. No. 14/743,200 dated Apr. 7, 2016.

Notice of Allowance Received for U.S. Appl. No. 14/743,200 dated Nov. 10, 2016.

Office Action Received for U.S. Appl. No. 14/743,200 dated Aug. 10, 2016.

Schulzrinne, H; Petrack, S; Request for Comments 2833 ("RFC 2833"), RTP Payload for DTMF Digits, Telephony Tone, and Telephony Signals May 2000, 29 pages, The Internet Society, U.S.

Donovan, S; Request for Comments 2976 ("RFC 2976"), The SIP INFO Method; The Internet Society, Oct. 2000, 9 pages, U.S.

Burger, E.; Dolly, M; Request for Comments 4730 ("RFC 4730"), A Session Initiation Protocol (SIP) Event Package for Key Press Stimulus (KPML), The Internet Society, Nov. 2006, 56 pages, U.S.

Schulzerinne, H; Taylor, T; Request for Comments 4733 ("RFC 4733"), RTP Payload for DTMF Digits, Telephony Tones, and Telephony Signals, The IETF Trust, Dec. 2006, 46 pages, U.S.

Homberg, C; Burger, E; Kaplan, H.; Request for Comments 6086 ("RFC 6086"), Session Initiation Protocol (SIP) INFO Method and Package Framework, Internet Engineering Task Force, Jan. 2011, 36 pages, U.S.

(56) References Cited

OTHER PUBLICATIONS

Kuthan, Jiri; Sisalem, Dorgham; SIP: More Than You Ever Wanted to Know About; Powerpoint Presentation, Mar. 2007, 242 pages, Tekelec, U.S.
Three Steps for Attacking Adherence Problems, Reynolds, Penny, Contact Center Association, Jan. 24, 2012.
Asterisk DTMF, Voip=Info.o—A Reference Guide to All Things VoIP, four pages, retrieved on Mar. 18, 2013 from www.voip-info.org/wiki/view/Asterosk+DTMF.
Notice of Allowance received for U.S. Appl. No. 13/861,102, dated May 2, 2014.
Office Action Received for U.S. Appl. No. 14/445,501 dated Nov. 24, 2015.
Notice of Allowance Received for U.S. Appl. No. 14/445,501 dated Feb. 4, 2016.
Office Action Received for U.S. Appl. No. 15/051,930 dated Nov. 10, 2016.
Notice of Allowance Received for U.S. Appl. No. 15/051,930 dated Jul. 12, 2017.
Office Action Received for U.S. Appl. No. 15/051,930 dated Mar. 3, 2017.
Office Action Received for U.S. Appl. No. 13/949,467 dated Feb. 6, 2015.
Notice of Allowance Received for U.S. Appl. No. 13/949,467 dated Jul. 17, 2015.
Office Action Received for U.S. Appl. No. 14/880,542 dated Jan. 4, 2016.
Notice of Allowance Received for U.S. Appl. No. 14/880,542 dated Jun. 1, 2016.
Office Action Received for U.S. Appl. No. 15/239,260 dated Jan. 27, 2017.
Notice of Allowance Received for U.S. Appl. No. 15/239,260 dated Feb. 21, 2017.
Office Action Received for U.S. Appl. No. 13/968,692 dated Jun. 11, 2015.
Notice of Allowance Received for U.S. Appl. No. 13/968,692 dated Nov. 15, 2016.
Office Action Received for U.S. Appl. No. 13/968,692 dated Nov. 30, 2015.
Office Action Received for U.S. Appl. No. 15/426,663 dated Mar. 23, 2017.
Notice of Allowance Received for U.S. Appl. No. 15/426,663 dated May 8, 2017.
Office Action Received for U.S. Appl. No. 14/073,083 dated Feb. 16, 2016.
Notice of Allowance Received for U.S. Appl. No. 14/073,083 dated May 25, 2016.
Noble Systems Corporation, Maestro 2010.1.1 Manual, vol. 4: IVR, Oct. 27, 2010, pp. 1-318, Noble Systems Corporation, Atlanta, GA.
Noble Systems Corporation, Maestro 2010.1.1 Manual, vol. 3: Reports, Aug. 18, 2010, pp. 1-124, Noble Systems Corporation, Atlanta, GA.
Noble Systems Corporation, Maestro 30319. 2010.1.1 User Manual, vol. 2, Aug. 3, 2010, 416 pages., Noble Systems Corporation, Atlanta, GA.
Noble Systems Corporation, Maestro 2010.1.1 User Manual, vol. 1, Aug. 17, 2010, 454 pages, Noble Systems Corporation, Atlanta, GA.
Office Action Received for U.S. Appl. No. 15/231,154 dated Feb. 10, 2017.
Notice of Allowance Received for U.S. Appl. No. 15/231,154 dated Mar. 16, 2017.
Office Action Received for U.S. Appl. No. 15/617,301 dated Jun. 28, 2017.
Notice of Allowance Received for U.S. Appl. No. 15/671,301 dated Sep. 12, 2017.
Office Action Received for U.S. Appl. No. 14/080,912 dated Apr. 8, 2016.
Notice of Allowance Received for U.S. Appl. No. 14/080,912 dated May 19, 2017.
Office Action Received for U.S. Appl. No. 14/080,912 dated Sep. 23, 2016.
Office Action Received for U.S. Appl. No. 14/080,912 dated Feb. 10, 2017.
Office Action Received for U.S. Appl. No. 14/172,993 dated Dec. 18, 2015.
Notice of Allowance Received for U.S. Appl. No. 14/172,993 dated Feb. 26, 2016.
Notice of Allowance Received for U.S. Appl. No. 15/157,472 dated Mar. 2, 2017.
Office Action Received for U.S. Appl. No. 14/186,404 dated Dec. 12, 2014.
Notice of Allowance Received for U.S. Appl. No. 14/186,404 dated Sep. 1, 2015.
Office Action Receivied for U.S. Appl. No. 14/186,404 dated May 8, 2015.
Office Action Received for U.S. Appl. No. 14/875,130 dated Dec. 1, 2015.
Notice of Allowance Received for U.S. Appl. No. 14/875,130 dated Feb. 24, 2016.
Notice of Allowance Received for U.S. Appl. No. 15/081,358 dated Jul. 27, 2016.
Office Action Received for U.S. Appl. No. 14/183,083 dated Oct. 7, 2016.
Notice of Allowance Received for U.S. Appl. No. 14/183,083 dated Feb. 3, 2017.
Office Action Received for U.S. Appl. No. 15/486,456 dated Aug. 7, 2017.
Notice of Allowance Received for U.S. Appl. No. 15/486,456 dated Sep. 27, 2017.
Office Action Received for U.S. Appl. No. 14/230,463 dated Jun. 19, 2015.
Office Action Received for U.S. Appl. No. 14/230,463 dated Mar. 30, 2016.
Office Action Received for U.S. Appl. No. 14/230,463 dated Oct. 1, 2015.
Office Action Received for U.S. Appl. No. 14/230,463 dated Jan. 14, 2016.
Office Action Received for U.S. Appl. No. 14/230,328 dated Nov. 28, 2014.

\* cited by examiner

USING A SPEECH ANALYTICS SYSTEM TO CONTROL RECORDING CONTACT CENTER CALLS IN VARIOUS CONTEXTS

CROSS REFERENCE TO RELATED PATENT APPLICATIONS

This application is a continuation of U.S. patent application Ser. No. 14/088,763, filed on Nov. 25, 2013, and incorporates by reference the contents of U.S. patent application Ser. No. 14/080,912, entitled "Architecture for Processing Real Time Event Notifications From A Speech Analytics System," filed on Nov. 15, 2013, and U.S. patent application Ser. No. 14/073,083 entitled "Configuring Contact Center Components for Real Time Speech Analytics," filed on Nov. 6, 2013, for all that they teach.

BACKGROUND

Contact centers may receive and/or originate communications with remote parties for various reasons. In some instances these communications may involve emails, webchats, texts, or other forms of character-based digital communications. In order for an agent to act on the content of such messages, the messages must be digitally processed and displayed to the agent, which inherently includes storage of the digital content in computer-readable form. The communication content may be stored as text strings, files, etc. The content can be received, stored, and then displayed to agents at subsequent times when needed. The inherent storage of such communications makes it easy to subsequently review the subject matter to confirm or verify the exchange of information that occurred.

When communication involves voice calls, the calls may be processed in real time without any long-term storage of the content. Verification of the original conversation is then difficult unless the voice call was recorded. Thus, it is often desirable to record voice conversations in a contact center to allow verification of the subject matter and to confirm that the agent involved followed various internal policies.

The technology used to record voice calls is readily available, inexpensive, and flexible. What is complex is interpreting the various state and federal statutes governing when calls may be legally recorded. These statutes define various conditions required before voice recording of a call is allowed. Generally speaking, if all parties on the call provide consent, then recording is allowable. However, there are exceptions for various conditions when recording can occur without express consent and these may depend in part on the state where the call is originating and/or terminating.

Some state laws allow voice calls to be recorded if only one party provides consent. These are sometimes referred to as "single-party consent" states. Other state laws allow calls to be recorded only if all parties have provided consent. These are referred to as "dual-party consent" or "multi-party consent" states. For intra-state calls, the law of the applicable state can be applied, but for inter-state calls, it is not always clear whether the originating or terminating state's laws govern the recording of the voice call. This may also depend on the particular states involved with the call.

Determining for a given call whether it can be legally recorded is difficult, and the laws have not always kept pace with recent technologies. For example, in the past, calls made to a landline based telephone number allowed easy determination as to what state the caller was located in. However, with telephone number portability, knowing the telephone number does not necessarily indicate what state the caller is located in. Similarly, even if the number has not ported, a wireless number does not necessarily represent which state the remote party is located in since many individuals may relocated to another state but retain their wireless number.

The contact center agent cannot be expected to know all the possible regulations and properly manually control recording of the call based on all the variables. In some instances, the agent may be expected to prompt the caller for authorization to record the call. Doing so takes time and requires the agent to manually control the recording systems in response to receiving the authorization. In some instances, the agent may forget or improperly control the equipment. A speech analytics system can be used to recognize the context and determine whether authorization has been provided, so as to automate control of the recording system. Thus, improved approaches are needed for recording voice calls in various contexts that can leverage the efficiency afforded by speech analytic systems. It is with respect to these and other considerations that the disclosure herein is presented.

BRIEF SUMMARY

In general, various embodiments disclosed herein involve the use of a speech analytics module ("SAM") detecting keywords spoken by an agent or called party, and providing appropriate speech-related event notifications to a call recording application specific module ("CR-ASM"). The CR-ASM receives various event notifications and determines for a particular call whether call recording is allowable, and if so, the CR-ASM may provide a visual icon to the agent on their computer indicating that the called party should be prompted for consent to record the call. The SAM may also provide an appropriate speech-related event notification indicating that the agent has requested consent from the called party and that consent has been detected in the speech of the called party. The CR-ASM may process the event notifications to properly control recording of the audio of the call, which may involve recording speech of the agent only, or speech of the agent and called party, depending on circumstances.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Additional background information regarding the operation of the contact center with respect to a speech analytics system is provided in further detail in the disclosure of the above mentioned patent applications. This background information describes various components that may be present in a contact center, how event notifications from the speech analytics system are generally processed, and how application specific modules may process event notifications for specific calls to implement specific capabilities or applications. The description of the overall framework is not repeated herein, but certain aspects are described as they relate to using speech analytics for controlling how calls can be recorded in various contexts. Although the examples provided to illustrate the concepts herein involve a contact center originating a call answered by a called party, the concepts could apply to other types of calls, including incoming calls to a contact center or other architectures.

Calls to a contact center may be recorded, based on various aspects. For some calling campaigns, calls may not be required to be recorded, and thus do not require any control of audio recording systems. For calls where recording is desired, the ability to record may depend on state laws that may be generally divided into "single-party consent" and "multi-party consent" (or sometimes referred to as "dual-party consent"). A single-party statute allows a single party to control whether the call may be recorded, where as a dual-party statute requires consent from both parties. Various combinations and outcomes have to be accommodated, since the outcome may depend on which state the call originates from, and which state the call terminates in.

Generally, there are three possible outcomes at a high level with respect to recording the call. First, no audio may be recorded at all. Second, audio of a single party may be recorded. This could be either the audio or speech of the agent or the remote party (regardless of whether the remote party is a calling party or a called party). Third, the audio of both parties may be recorded. If so, then the audio may be recorded as a single audio stream that comprises audio from both parties or two audio streams may be recorded, one associated with the agent and the other associated with the remote party.

A speech analytics system is used to monitor the call and provide event notifications of recognized keywords. The event notifications are provided to an event handler module, which in turn may provide the event notifications to an application specific module ("ASM"). The ASM may, in turn, provide visual and/or other indications to the agent and automatically control recording the audio of the call. The ASM does this as appropriate for: the context (e.g., based on the applicable state laws), the contact center policies applicable for that particular call, and as appropriate based on whether consent was required and provided. Providing this by the ASM largely frees the agent from focusing on procedures associated with recording a call and allows the agent to focus on the purpose of the call.

Call Recording Architecture

Figure 1:
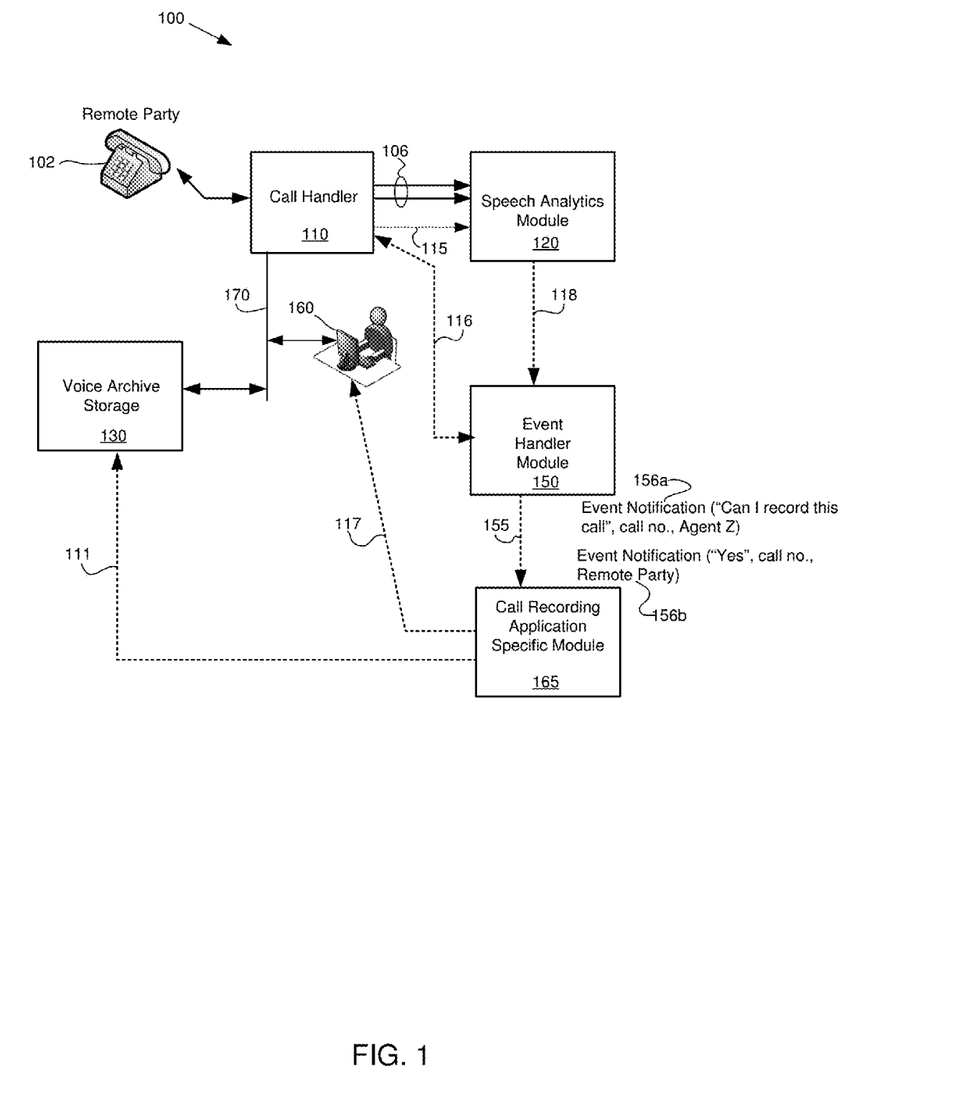
FIG. 1 illustrates an architecture of one embodiment of a contact center wherein a speech analytics module is used to control other components in the contact center for recording audio associated with a call.

Turning to FIG. 1, a high level architecture 100 of the relevant components involved is shown. The architecture 100 comprises a remote party represented by a conventional telephone 102, although any number of devices and technologies may be used. The remote party may be a calling party or a called party relative to the contact center. For purpose of illustration, and not for limitation, the examples herein focus on the contact center originating the call to the remote party. The remote party communicates with a call handler 110, which may be any number of various devices used for processing calls in a contact center, including but not limited to: automatic call distributors ("ACDs"), interactive voice response units ("IVRs"), dialers, predictive dialers, private branch exchanges ("PBXs"), etc.

The call handler may variously connect the remote party with a computer 160 used by an agent. The computer may be part of a workstation that also includes a voice device (i.e., phone), such as a headset, telephone, soft-phone etc. (not shown). The voice device may be a so-call soft-phone integrated into the computer 160 or a separate device. A local area network ("LAN") 170 may be used to transfer voice and data to the agent's workstation. In other embodiments, separate facilities may be used for data transfer to the agent's computer and for voice communication with the agent's phone. The exact technology and configuration of the agent's workstation is not relevant, as long as there is a voice connection between the agent and the remote party. There may be a number of other configurations involved with respect to connecting the remote party and the agent, but this does not alter the principles of the concepts disclosed herein.

The call handler 110 is configured to bridge on or conference the speech analytics module ("SAM") 120 for the call between the agent and the remote party. This can be accomplished in a number of ways, and again it is possible to use a number of different technologies. In summary, a call leg (a.k.a. a conference call leg) is established between the call hander and the SAM. This call leg is conferenced to the call between the agent and the remote party. For purposes of illustration, it is assumed that this call leg from the call handler 110 involves establishing two separate Voice over IP ("VoIP") streams 106 to the SAM. One of the streams 106 conveys audio (i.e., speech) from the agent and the other conveys audio from the remote party. Thus, the SAM knows which audio stream is from which party, and thus speech detected on one of the streams can be readily associated with the appropriate party on the call. A signaling link 115 between the call handler 110 and the SAM 120 provides the appropriate signaling information necessary to establish and terminate the VoIP signaling streams 106 and indicate the necessary information. Signaling or control data is generally shown as a dotted line in FIG. 1 and voice data is shown as a solid line.

Thus, in summary, whenever a call exists between the remote party and the agent, the SAM 120 is effectively conferenced in, or bridged on to, the call. The SAM only listens to the call, and does not originate any audio into the call.

Two other components shown in the architecture 100 are the event handler module 150 and the call recording application specific module 165 ("CR-ASM). The event handler module receives event notification messages from the SAM 120. Event notification messages are messages that indicate information about a call or about speech detected on the call. The former event notifications are referred to as "call-related event notification messages" or simply "call-related event notifications" and these indicate the establishment or termination of a call. Thus, for simplicity, the "messages" qualifier may not be used in all instances.

The event notifications may be transmitted from the call handler to the event handler module as depicted by path 116. The latter event notifications are referred to as "speech-related event notification messages" (or simply "speech-related event notifications") and these indicate detection of a keyword in the speech of a particular call. The speech-related event notification messages originate from the SAM 120 and are transmitted to the event handler module as depicted by path 118. In some embodiments, there may be a number of speech-related event notifications that are detected during a call, and so in the context of a given call, there may be many speech-related event notifications received by the event handler. In contrast, there are typically two call-related event notifications associated with a given call—an indication that the call has been established and another indication that the call has been terminated. Hence, because the speech-related event notifications are directly related to detecting keywords in many contexts discussed herein, reference to an "event notification" may implicitly refer to a speech-related event notification. Usually, the context in which the phrase is used will indicate whether "event notification" includes both types or just refers to the speech-related type.

The call handler 110 provides information to the SAM 120 regarding calls established and terminated between agents and remote parties, via the signaling link 115. Thus, in some embodiments, the SAM may provide the call-related event notification messages to the event handler module, and the path 116 between the call handler and the event handler module may not be required. In either embodiment, the event handler module receives the call-related event notification messages in some manner.

At a high level, the purpose of the event handler module is to route the event handler messages to the appropriate ASM. There may be a number of different types of ASMs defined, which may require receiving the event notification messages. In one embodiment, the event handler module is configured to route a copy of the call-related event notification messages to each ASM, and route a copy of each speech-related event notification message only to appropriate ASMs. This may involve routing the speech-related event notification message to each ASM, or selectively routing the speech-related event notification to only certain ASMs. Further information as to the reasoning and details of this operation can be found in the aforementioned patent applications that are incorporated by reference.

In FIG. 1, the event-handler module 150 receives the event notifications, and communicates these to the CR-ASM 165. For purpose of illustration, only one ASM is shown in FIG. 1, since ASM 165 is the only module of consequence with respect to call recording. Other ASMs (not shown) may perform other functions. As shown in FIG. 1, the event handler module may route messages 156a, 156b to the CR-ASM 165 upon receiving these messages using a signaling link 155. For example, these notifications may indicate that the phrase (or equivalent) "Can I record this call" was detected on a particular call number and detected on the audio associated from "Agent Z." Another speech-related event notification is shown, which reports detection of the phrase "Yes" for that same call, but spoken by the Remote Party. Receipt of such messages allows the ASM to determine various aspects of the audio context on a given call, namely that permission to record the call was requested by the agent, and permission was granted by the remote party.

The CR-ASM 165 may react in various ways in response to receiving event notifications. For example, the CR-ASM 165 may provide various information messages to the agent's computer 160, such as text messages, visual icons, etc. using signaling link 117. In addition, various control messages may be sent using signaling link 111 to a voice archive storage component 130 ("VAS") or to other components to indicate that audio data should be stored and indexed. This may depend on the type and details of the event notification received. Depending on the context, notifications, reports, and other data may be sent or stored to provide details on the particular audio context. These and other aspects will become evident by describing an embodiment of how the CR-ASM may be configured to control the recording of the call.

CR-ASM Process Flows

Figure 2:
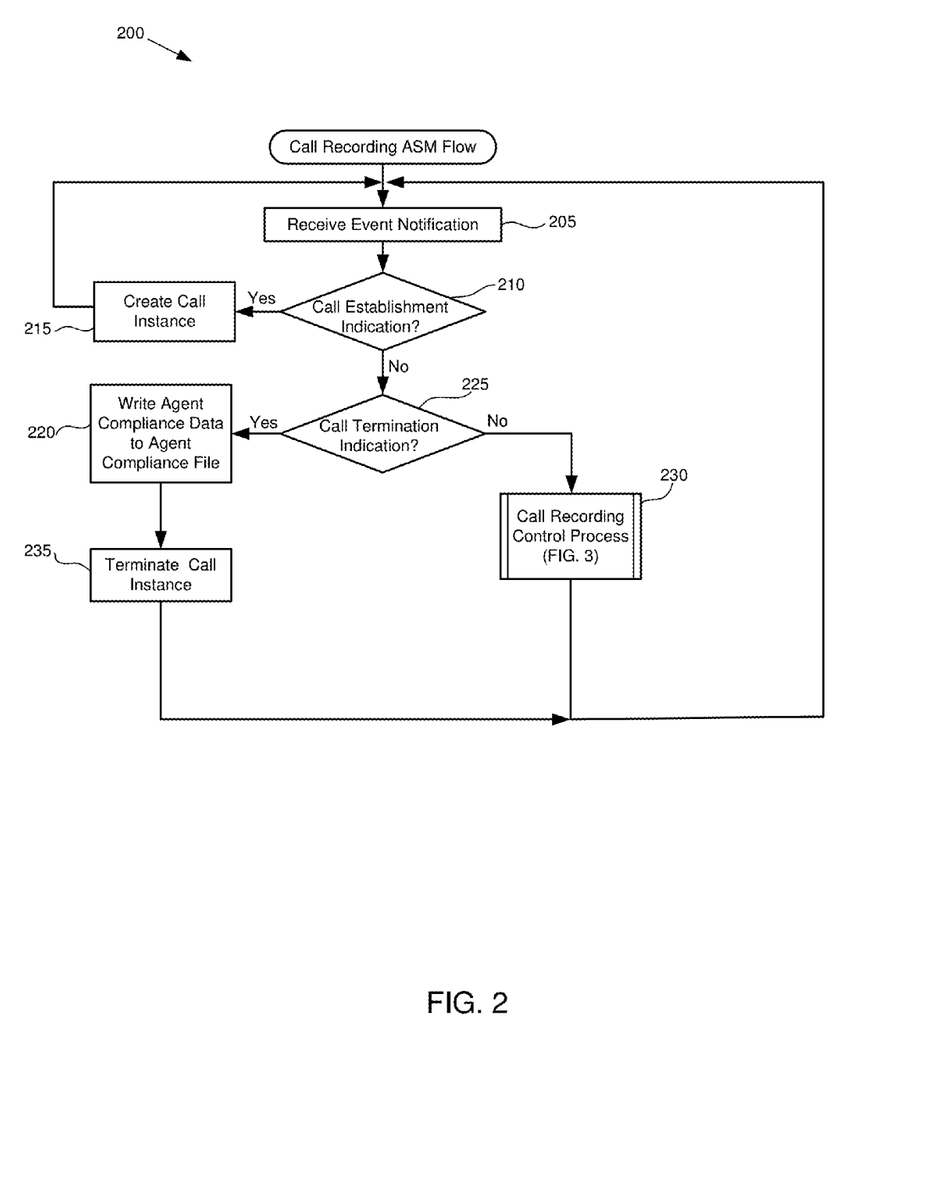
FIG. 2 illustrates one process flow associated with an application specific module for processing call-related event notifications associated with a call, wherein audio of the call may be recorded.

The CR-ASM ("CR-ASM") process flow describes how event notifications are processed. The logic defined in the CR-ASM operates on each call separately from other calls handled by the CR-ASM. The first process flow, shown in FIG. 2, represents the process flow for processing call-related event notifications. Recall that these event notifications inform the CR-ASM of the establishment and termination of a call. This reflects a call between an agent and a remote party that involves the call handler, and which the call handler has established audio streams to the SAM. In this respect, the processing is relatively simple, as each ASM (including the CR-ASM) typically creates a call instance upon the establishment of a call between the call handler and the SAM. The call instance is a data structure unique for that application that maintains data specific to a call. When establishment of a call is reported, ASM specific data structures (e.g., the call instance) may be generated, which may then be modified when subsequent speech-related event notifications are received for that call. Then, when the call is reported as terminated, the call instance may be saved, processed, and/or erased.

Turning to the process flow 200 of FIG. 2, the process begins with receiving the event notification in operation 205. A test in operation 210 determines whether this is a call-related event notification, specifically, whether this indicates a call establishment. If so, then the process proceeds to operation 215 where a call instance is created, which is associated with the call that was reported as being generated. This can be accomplished by using a call reference identifier, call number, or some other similar form of call identifier. The creation of the call instance results in generating a data structure stored in the memory of the CR-ASM. The data structure is defined by the CR-ASM and is typically unique relative to other ASMs.

Assuming that in operation 210 the event notification received does not report the establishment of a call, then the next test is to determine whether the event notification reports the termination of the call in operation 225. If so, then the process proceeds to operation 220 where any data agent compliance data stored (or a defined subset) in the call instance is then saved by writing it to e.g., an agent compliance file. Saving the call instance data functions to save the desired information of the audio context, as appropriate. In this example, information about an agent that fails to request recording consent when prompted by the system will be noted and recorded when the call ends. This allows supervisors to ascertain how many times, and in what instances, the agent failed to ask for recording permission, when informed to do so by the CR-ASM. After data has been saved, the call instance can be terminated in operation 235. The operation then returns to wait for the next event notification message in operation 205.

If the event notification is not a call-related event notification, then the process flow continues from operation 225 to operation 230. This process flow reflects the processing of a speech-related event notification for that call, which is indicated by the call recording control process 230. In this case, the processing of a speech-related event notification is shown as a separate process flow in FIG. 3.

The process flow shown in FIG. 2 is somewhat generic for the different types of ASMs that can be defined. Namely, any required call instances in the ASM are usually created upon establishment of a call, and any data generated in the call instance may be saved when the call terminates. In many instances, there may not be any intervening speech-related event notifications pertaining to the call recording application, so there may not be any changes to the call instance during the call.

Figure 3:
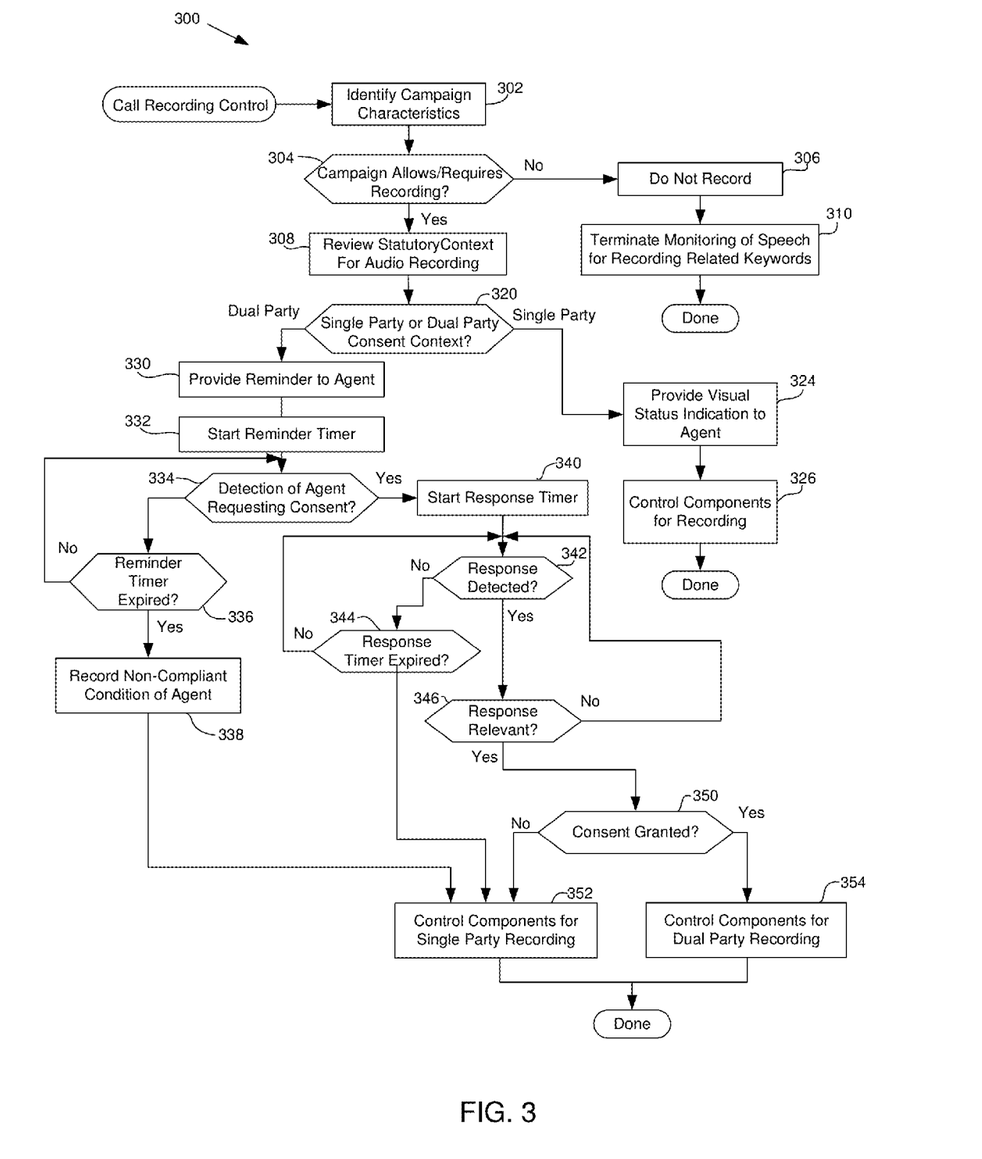
FIG. 3 illustrates one process flow associated with the application specific module for processing speech-related event notifications associated the call, wherein audio of the call may be recorded.

The process flow for the speech-related event notifications, as shown in FIG. 3, however, is largely dependent on the particular application processing for the audio context. Turning to FIG. 3, the call recording control process flow 300 is shown. This is but one embodiment of the call recording control process flow, and a number of variations can be defined. Some of the capabilities shown in FIG. 3 are included to highlight some of the capabilities and functions that may be performed by a CR-ASM, and not all embodiments of a CR-ASM will include the functionality shown, and may include more or less functionality.

The first operation is to identify the campaign and associated characteristics for the call associated with the speech-related event notification in operation 302. This can be done by examining an explicit campaign identifier parameter or other identifier that may be included in the event notification message, or by looking up campaign identifier information using the call reference identifier. The campaign information may include information as to whether the campaign should record calls or not. This reflects an embodiment where some calls (e.g., some campaigns) may require call recording and calls associated with other campaigns do not. If all calls were recorded, then this operation may be optional.

Once the campaign information is obtained, then the next operation is to ascertain whether recording should occur for this call based on the campaign characteristics in operation 304. If the answer is "no", then in operation 306 no recording is to be performed. It may be appropriate to further instruct the SAM to terminate any monitoring for call recording related keywords in operation 310. This optional step may allow processing resources in the SAM to be conserved, since if recording is not to occur, then monitoring for audio related to recording is not necessary. This may result in the CR-ASM sending an appropriate command message to the SAM (not shown in FIG. 2).

In other embodiments, the indication to record a call could be defined based on other parameters than the campaign identifier. For example, only calls handled by certain agents should be recorded, a random sampling of calls is recorded, or calls originated at certain time or locations should be recorded.

Assuming that recording is to occur for the campaign in operation 304, then in operation 308 the CR-ASM reviews the statutory context for this call. This may involve ascertaining the originating state, the terminating state, analyzing their respective call recording laws and determining whether consent is required from a single party or both parties. This can be accomplished by mapping the telephone number of the called party to a particular state. Then, the statutory requirements for that state may be determined. A number of factors may be involved in ascertaining what the context is. Thus exact procedures for determining whether recording may or may not be allowed depends on various factors, and will likely require legal input to determine whether it is allowed. Presumably, the CR-ASM has been programmed with such rules. A variety of approaches can be used to implement these rules.

Next, in operation 320, a determination is made whether consent is required from a single party or from both (dual) parties. If consent is required from a single party, then a visual indication may be provided to the agent's computer in operation 324 informing the agent of this situation. In essence, an icon or text message may be displayed on the agent's computer that informs the agent that there is no requirement to request consent from the remote party. Since consent from the agent is presumed to be present, there is no further action required by the agent, and the CR-ASM will then control the necessary components for recording the call in operation 326.

For instance, returning to FIG. 1, the actions for effecting recording may involve the CR-ASM sending a message to a recording system via path 111, such as to a voice archive storage system ("VAS") 130 instructing the VAS to access the audio data on the LAN 170 and record the audio. Other forms of audio recording systems could be used. The CR-ASM may, in such cases, record one party or both parties on the call. The CR-ASM may also send commands to the call handler, if necessary indicating it perform other functions related to recording the call. For example, recording may be accomplishing by the call handler storing the call data in its memory in lieu of using a VAS. There are a variety of control messages and architectures that can be initiated by the CR-ASM 165 in a contact center that instruct various components to record the audio of a given call. The architecture shown in FIG. 1 is but one such architecture, and other architectures and messaging paths may be used.

Returning to FIG. 3, the process flow in operation 320 reflects where only a single party's consent is required and does not involve monitoring the speech to ascertain whether consent was requested and received. The agent is not required to request or control recording as the CR-ASM causes recording of the call to occur. If however, the CR-ASM determines in operation 320 that dual consent is required, then the process flow is slightly more complicated.

In this embodiment, the CR-ASM 165 provides a visual reminder to the agent in operation 330. The CR-ASM may send a message or command to the agent's computer to display an icon and/or text message informing the agent that recording consent should be requested from the remote party for this call. At this point, a timer in the CR-ASM may be started in operation 332. This timer functions to define a time period during which the agent is expected to ask the remote party for permission to record the call.

Next, in operation 334, the process flows determines whether a speech-related event notification has been received that reflects the agent requesting consent. Recall that in FIG. 1, one of the event notification messages 156a detecting a phrase "Can I record this call" may be sent. In many embodiments, these speech-related event notification(s) may indicate information, such as a set of words, a phrase, or words detected in vicinity of each other. Thus, in some embodiments, the SAM may report phrases such as "Can I" and "record" and "call" as spoken by the agent. The CR-ASM may be configured to analyze these phrases to ascertain whether the agent request consent to record the call. How this determination depends on the specifics as to what keywords and phrases are defined in the SAM, what is reported in event notification messages, etc.

If there is no speech-related event notification received in operation 334, then the process flow proceeds to operation 336 where a check is made to see if the reminder timer has expired. Recall that this timer is started after the visual reminder is presented to the agent informing the agent to request consent. If the agent does not ask for consent within this time period, then upon the timer expiring in operation 336, a non-compliant condition is recorded in the call instance in operation 338. This non-compliance data may include data identifying the call and the agent. Since consent was not asked (and presumably not obtained), in this embodiment recording of only a single party (the agent) is performed in operation 352. In other embodiments, no recording may be initiated. This option reflects the possibility that it may be allowable to record one party in a phone call if consent is not provided by the other party. If this is not allowable, then neither party would be recorded. Thus, the process flow after operation 338 may vary in other embodiments.

If, in operation 334, the agent has been detected as requesting consent from the remote party, then a response timer is started on operation 340. This timer defines a time period where the party is expected to provide a response. The next operation is a test in operation 342 that detects whether another speech-related event notification is received that indicates a response to the agent's request was provided by the remote party. This may be as simple as receiving an event notification that reports a "yes" was spoken, as reflected in event notification message 156b in FIG. 1. Of course, the SAM should be designed to also accommodate the remote party speaking other terms that reflect consent, such as: "yeah", "okay", "that's all right," etc. Again, the CR-ASM and the SAM must be designed to address such occurrences and be configured to properly ascertain whether consent was provided. In one embodiment the SAM can report each of such phrases and let the CR-ASM resolve these different event notifications, a process called lemmalization, or vice versa.

Assuming a response is detected from the remote party in operation 342, a test occurs in operation 346 as to whether the response is relevant. It is possible, based on the system design, that the event handler module may route each speech-related event notification to each ASM. Thus, a received speech-related event notification may be received as providing information that is not relevant to this particular audio context. For example, a number of different ASMs may be defined in a system that monitors whether the agent asks various types of questions to a remote party. The answer may be germane to a number of audio contexts. Specifically, an ASM that monitors whether the agent confirms removing a telephone number on a calling list will monitor the remote party's speech for a "yes" or "no" just as will the CR-ASM that monitors the remote party's speech for the same responses in the context of granting consent to record a call. Thus, if the response detected in operation 346 is not relevant to the CR-ASM, it is ignored and the process loops back to operation 342.

At some point, if no response is detected, then in operation 342 the response timer will have expired in operation 344. If so, then it may be presumed that no consent from the remote party was received, and the default recording on the agent only may proceed in operation 352.

On the other hand, if a response is received in operation 342 from the remote party, and the response is relevant in operation 346, then a test occurs as to whether the speech-related event notification grants or denies permission in operation 350. This can be as simple as determining whether the event notification reported a "yes" or "no" from the remote party. If consent is granted, then the recording of the call (e.g., audio from both the agent and the remote party) may commence in operation 354. If consent is not granted, then recording of only a single party (the agent) may commence in operation 352. Of course, other embodiments may not record either party if consent is denied, based on the statutory context.

This embodiment illustrates how the CR-ASM can monitor a call and assist the agent by providing visual prompts, such as reminders, as to when the agent should verbally request consent to record the call, and then monitor the party's response so as to then automatically control how and what audio is recorded. The agent may also be provided with visual indications that no action is required on their part or that recording has commenced. Thus, the agent is no longer distracted to initiating the steps for recording the call besides requesting consent from the party.

Other variations on the actions taken by the CR-ASM may now be appreciated in light of the foregoing disclosure. As noted, the CR-ASM may inform the agent as to when to prompt the remote party for consent. In some embodiments, a colored or flashing icon could be presented, along with text, to inform the agent that a verbal prompt is necessary. In other embodiments, warning icons could be provided if the agent did not request a prompt within a certain time period. Other actions could include notifying a supervisor if the agent does not request a prompt after being reminded. Details of the audio context may be noted so that each and every circumstance could be recorded when the agent did not respond to a prompt.

Furthermore, the CR-ASM could instruct various components as to whether no streams, a single VoIP stream, or dual VoIP streams of the call should be recorded. The CR-ASM could control a number of components involved in recording audio, so that recording of the audio may be obtained from a variety of sources depending on the embodiment (e.g., the agent's workstation, the call handler, the SAM, etc.). This allows the CR-ASM to be configured as appropriate for a particular contact center architecture.

In other embodiments, the system may operate on incoming calls which are routed first to an IVR, which is connected to the SAM, or which has a SAM integrated into the IVR. If so, event notifications may be reported to the event handler module and then to the CR-ASM in another system. Thus, it is possible that the event handler, SAM, and ASM may be executing in separate systems, shared systems, co-located in the same contact center, or remotely located relative to each other. Furthermore, each of these separate systems could be provided as a hosted service.

Other Embodiments

In other embodiments, the CR-ASM may be configured to automatically record the call, after the call has commenced, based on detection of various keywords. For example, certain keywords may trigger recording in spite of regulatory constraints, such as if terroristic or threatening speech is detected during the call. For example, speech detected from a remote party indicating a "bomb" or "killing" is detected may result in recording the call. In such instances, recording constraints may be overruled, as there is the possibility of the commission of a crime, which may exempt prohibitions of recording the call. Thus, even if permission to record was not granted, or is not required by the campaign, detection of certain keywords may cause the CR-ASM to control the appropriate components to record the audio. In addition, suitable real-time notifications can be provided as appropriate.

In other embodiments, the CR-ASM can be used to control recording for incoming calls. In such embodiments, the incoming call may be answered by a call handler, which then connects the call to an available agent. The agent may then be informed by the CR-ASM as to whether the agent should prompt the incoming party for consent, and the CR-ASM then monitors the party as to whether consent was provided. The remaining portion of the call, such as analyzing the party's response, may be the same as in other embodiments. In other embodiments, the incoming call may be received by a voice response system which instructs the party that if they do not want the call to be recorded that they should inform the agent once the party is connected to the agent that recording is not to occur. In this case, the party's speech may be first monitored to determine whether they proactively requested that recording not occur and then the CR-ASM may then monitor the agent's response and control the recording equipment accordingly. This switches the relative order of who is monitored first, and whose response is then expected.

Exemplary Hardware
Exemplary Computer Processing Device

Figure 4:
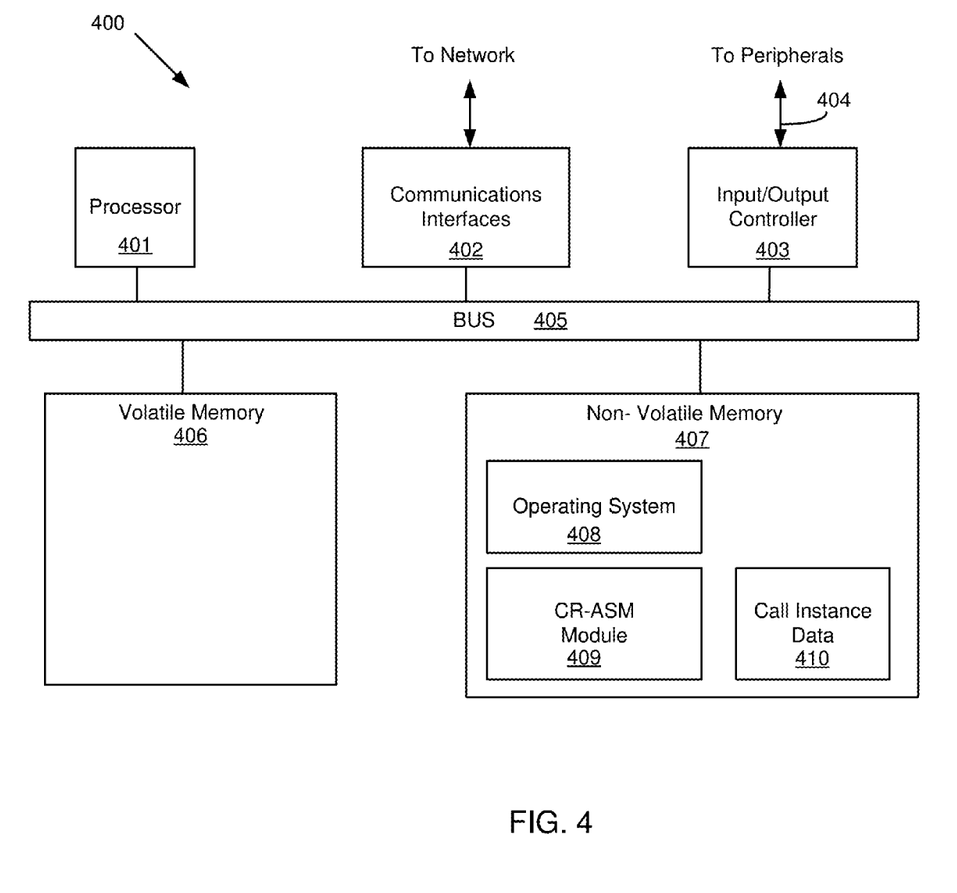
FIG. 4 illustrates an embodiment of a processing device for practicing various technologies and concepts disclosed herein.

FIG. 4 is an exemplary schematic diagram of a computer processing system that may be used in embodiments to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 4, the processing system 400 may include one or more processors 401 that may communicate with other elements within the processing system 400 via a bus 405. The processor 401 may be implemented as one or more complex programmable logic devices ("CPLD"), microprocessor, integrated circuit ("IC") based microprocessor, a von-Neumann architecture-based digital computer, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 400 may also include one or more communications interfaces 402 for communicating data via a data network, such as a local network, with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 403 may also communicate with one or more input devices or peripherals using an interface 404 such as, but not limited to: a keyboard, a mouse, a touch screen/display input, microphone, pointing device, etc. The input/output controller 403 may also communicate with output devices or peripherals, such as displays, printers, speakers, headsets, banner displays, etc. These may be used, in part, to receive administrator input, such as for configuring the system's operation.

The processor 401 may be configured to execute instructions stored in volatile memory 406, non-volatile memory 407, or other forms of computer readable storage media accessible to the processor 401. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 407 may store program code and data, which also may be loaded into the volatile memory 406 at execution time. For example, the non-volatile memory 407 may store one or more modules, such as the CR-ASM module 409 that may implement and perform the above-mentioned process flows containing instructions for performing the process and/or functions associated with the technologies disclosed herein, as well as operating system code 408. The CR-ASM module 409 may also manage data such as the call instance data 410 for configuring streaming involved in various calls. The data in the non-volatile memory may be copied (not shown) in the volatile memory 406 at run time. The volatile memory 406 and/or non-volatile memory 407 may be used to store other information including, but not limited to: records, applications, programs, scripts, source code, object code, byte code, compiled code, interpreted code, machine code, executable instructions, or the like. These may be executed or processed by, for example, the processor 401 and may form a part of, or may interact with, the CR-ASM module 409.

The technologies described herein may be implemented in various ways, including as computer program products comprising memory storing instructions causing a processor to perform the operations associated with the above technologies. The computer program product may comprise a non-transitory, tangible computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). The computer readable storage media includes all the above tangible identified computer readable media (including volatile and non-volatile media), but does not include a transitory, propagating signal, photon based storage media, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

The examples for illustrating the concepts and the technologies herein have focused on agents in a contact center, but could be easily applied to other types of applications. For example, although the examples refer to operation in the context of outbound calls, the principles and concepts can be applied to a contact center handling inbound calls. Further, those skilled in the art will recognize that in light of this disclosure, many alternative embodiments could be designed taking into account the concepts and technologies disclosed herein.

The invention claimed is:

1. A method for automatically recording audio of a telephone call in a contact center, comprising:
    establishing the telephone call between a human agent and a remote party using a call handler;
    determining that consent from the remote party is required to record the telephone call;
    providing a graphical indication on a computer used by the human agent indicating the consent from the remote party is required to record the telephone call;
    providing the audio of the telephone call from the call handler to a speech analytics system ("SAS") using two audio streams, wherein a first audio stream conveys speech of the human agent and a second audio stream conveys speech of the remote party;
    providing a first one or more speech-related event notifications from the SAS to a call recording application specific module ("CR-ASM") executing on an application specific processing system indicating the first audio stream comprises a request from the human agent to obtain the consent from the remote party to record the telephone call;
    detecting by the SAS in the second audio stream the remote party providing the consent to record the telephone call;
    providing a second one or more speech-related event notifications from the SAS to the CR-ASM indicating the second audio stream comprises the remote party providing the consent to record the telephone call; and
    causing the audio of the telephone call to be recorded in one or more storage media by the CR-ASM in response to receiving the second one or more speech-related event notifications.

2. The method of claim 1, wherein the consent is based on a U.S. state associated with a location of the remote party.

3. The method of claim 2, wherein the U.S. state requires consent from both parties on the telephone call to record the telephone call.

4. The method of claim 2 further comprising determining the U.S. state associated with the location of the remote party is based on a telephone number associated with the telephone call.

5. A system for controlling recording of telephone calls comprising:
    a call handler configured to:
        establish a telephone call between a human agent and a remote party; and
        provide audio of the telephone call to a speech analytics component using two audio streams, wherein a first audio stream conveys speech of the human agent and a second audio stream conveys speech of the remote party; and
    an application specific processing component configured to:
        determine that consent from the remote party is required to record the telephone call;
        provide a graphical indication on a computer used by the human agent indicating the consent from the remote party is required to record the telephone call;
        receive a first one or more speech-related event notifications from the speech analytics component indicating the first audio stream comprises a request from the human agent to obtain the consent from the remote party to record the telephone call;
        receive a second one or more speech-related event notifications from the speech analytics component indicating the second audio stream comprises the remote party providing the consent to record the telephone call; and
        cause the audio of the telephone call to be recorded in one or more storage media in response to receiving the second one or more speech-related event notifications.

6. The system of claim 5, wherein the graphical indication comprises an icon based in part on a U.S. state associated with a geographic location of the remote party.

7. The system of claim 5, wherein the application specific processing component is further configured to:
    determine that recording the telephone call is allowable prior to providing the graphical indication based in part on a U.S. state associated with a geographic location of the remote party.

8. The system of claim 5, wherein the call handler is configured to provide a call-related event notification to the application specific processing component contemporaneously with establishing a call leg to the speech analytics component.

9. A non-transitory computer readable medium storing instructions that when executed by a processor cause the processor to:
    determine consent from a remote party is required to record a telephone call between a human agent and the remote party, wherein audio of the telephone call is provided to a speech analytics system using two audio streams, a first audio stream conveying speech of the human agent and a second audio stream conveying speech of the remote party;
    provide a graphical indication on a computer used by the human agent indicating the consent from the remote party is required to record the telephone call;
    receive a first one or more speech-related event notifications from the speech analytics system indicating the first audio stream comprises a request from the human agent to obtain the consent from the remote party to record the telephone call;
    receive a second one or more speech-related event notifications from the speech analytics system indicating the second audio stream comprises the remote party providing the consent to record the telephone call; and
    cause the audio of the telephone call to be recorded in one or more storage media in response to receiving the second one or more speech-related event notifications.

10. The non-transitory computer readable medium of claim 9, wherein the instructions further cause the processor to:

determine that recording the telephone call is allowable prior to providing the graphical indication based in part on a geographic location associated with the remote party.

11. The non-transitory computer readable medium of claim 9, wherein the telephone call is placed to a landline telephone number and the instructions further cause the processor to:

determine a U.S. state of the remote party based on the landline telephone number.

12. The non-transitory computer readable medium of claim 9, wherein the instructions further cause the processor to:

start a timer in response to receiving the first one or more speech-related event notifications; and stop the timer in response to receiving the second one or more speech-related event notifications.

13. The non-transitory computer readable medium of claim 9, wherein the instructions further cause the processor to:

provide a visual icon for display on the computer used by the human agent indicating the telephone call is being recorded.

\* \* \* \* \*